United States Patent [19]

Stoffer et al.

[11] Patent Number: 5,466,722
[45] Date of Patent: Nov. 14, 1995

[54] ULTRASONIC POLYMERIZATION PROCESS

[76] Inventors: James O. Stoffer, 16 Laird; Oliver C. Sitton, R.R. 1 Box 227F, both of Rolla, Mo. 65401

[21] Appl. No.: 188,215

[22] Filed: Jan. 27, 1994

Related U.S. Application Data

[63] Continuation-in-part of Ser. No. 933,387, Aug. 21, 1992, abandoned.

[51] Int. Cl.$^6$ .................................................. C08F 2/56
[52] U.S. Cl. .................. 522/51; 522/54; 522/59; 522/61; 522/62; 522/84; 522/168; 522/175; 522/177; 522/182; 522/184; 522/185; 522/187; 522/188
[58] Field of Search .................. 522/51, 54, 59, 522/61, 62, 84, 168, 175, 177, 182, 184, 185, 187, 188

[56] References Cited

U.S. PATENT DOCUMENTS

| | | | |
|---|---|---|---|
| 4,849,318 | 7/1989 | Tsuboto et al. | 430/137 |
| 4,919,804 | 4/1990 | Dorsey et al. | 210/198.2 |

FOREIGN PATENT DOCUMENTS

| | | |
|---|---|---|
| 1249024 | 8/1986 | U.S.S.R. |
| 1249023 | 8/1986 | U.S.S.R. |

OTHER PUBLICATIONS

Bremner, Chemistry in Britain, 633, 122 (1986).
Briggs, Johnson, and Mason, J. Acoust. Soc. Amer., 45, 659 (1939).
Kruus, McDonald, and Patraboy, J. Phys. Chem., 91, 3041 (1987).
Kruus and Patraboy, J. Phys. Chem., 89, 3379 (1985).
Kruus, Lawrie, and O'Neill, Ultrasonics, 26, 352 (1988).
Kruus, in Advances in Sonochemistry, vol. 2, p. 1 (Greenwich, Conn. 1991).
Kruus, O'Neill and Robertson, Ultrasonic, 28, 304 (1990).
Lindstrom and Lamm, J. Phys. and Colloid. Chem., 55, 1139 (1951).
Liu and Yan, Makromol. Chem., Rapid Commun., 9, 27 (1988).
Lorimer, Mason & Kershaw, J. Chem. Soc., Chem. Commun., 1217 (1991).
Price, Smith and West, Ultrasonics, 29, 167 (1991).
Price, Caw, Newcomber & Smith, British Polymer Journal, 23, 63 (1990).
Suslick, Scientific American, 260, 80 (Feb. 1989).
Stoffer, Sitton, and Kao, Polym. Mater. Sci. Eng. Prepr., 65, 42 (1991).
Stoffer, Sitton, Morales and Kao, Polym. Mater. Sci. Eng. Prepr., 66, 316 (1992).
Stoffer, Sitton and Kim, Polym. Mater. Sci. Eng. Prepr., 67, 242 (1992).
Chou, Liu, Stoffer and Sitton, Polym. Mater. Sci. Eng. Prepr., 69, 376 (1993).
Stoffer, Sitton and Chou, Proc. Water–Borne and Higher–Solids and Powder Coatings Symp. 1993, p. 436.

*Primary Examiner*—Mark Nagumo
*Attorney, Agent, or Firm*—Polster, Lieder, Woodruff & Lucchesi

[57] ABSTRACT

Polymerization of ethylenically unsaturated monomers such as methyl methacrylate can be initiated in solutions containing monomer and a special non-polymeric initiator with intense ultrasound. The number average molecular weight of the poly(methyl methacrylate) that forms is about 300,000 gmol$^{-1}$ as compared with polystyrene standards. The conversion of the polymerization is about 50% for poly(methyl methacrylate). Variations of the polymerization rate with time and the amount of the initiator are explained by a simple reaction mechanism.

25 Claims, 1 Drawing Sheet

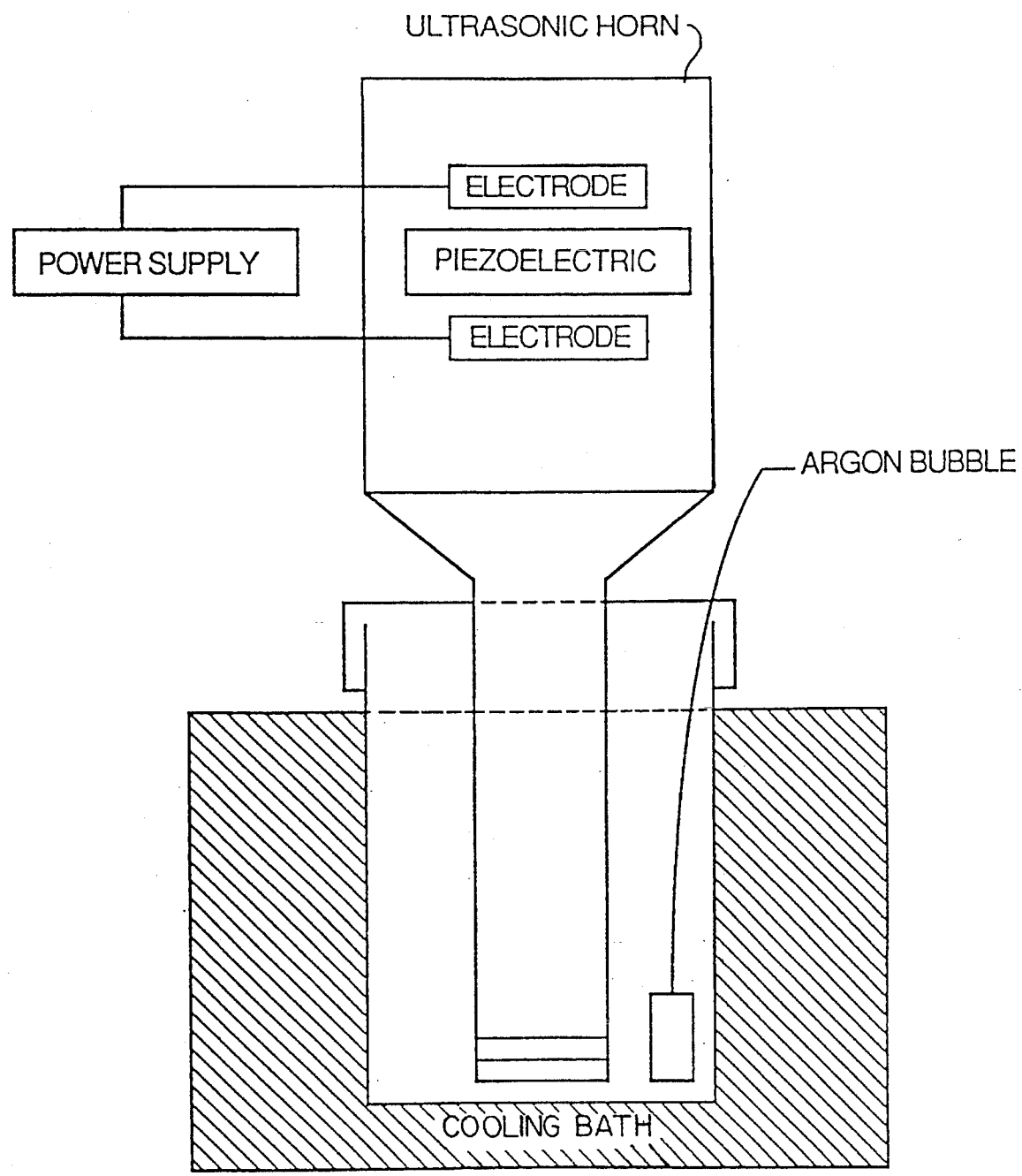

ULTRASONIC POLYMERIZATION PROCESS

CROSS-REFERENCE TO RELATED APPLICATION

This is a continuation-in-part of application Ser. No. 933,387, filed Aug. 21, 1992, now abandoned.

BACKGROUND OF THE INVENTION

This invention relates to a polymerization process and in particular to a method of polymerizing ethylenically unsaturated monomers by classical free radical polymerization. These monomers include unsaturated carbon-carbon bonds which are broken during polymerization, such as alkenes, various vinyl halides, acrylics, and acrylonitriles. The invention has applicability to a wide range of direct homo- and copolymerization processes, including bulk, emulsion, suspension, solution, and precipitation processes.

Classical free radical initiated polymerization of ethylenically unsaturated monomers is carried out by means of a small quantity of an added initiator which, under the reaction conditions, breaks down to form a free radical. The free radical activates the carbon-carbon double bond of the monomer and initiates chain growth. Under varying reaction conditions, the same compound can act as either an initiator or a chain transfer agent.

Traditionally, the free radical initiator is activated by heat. This approach has a number of drawbacks, the most serious of which is the instability of many systems at higher temperatures. Ultraviolet radiation has been utilized to activate free radical initiators, but this technique is of limited usefulness in the presence of pigments, as is the case when monomers in paint are polymerized.

SUMMARY OF THE INVENTION

One of the objects of this invention is to provide an efficient, simple process for polymerizing ethylenically unsaturated monomers in high yields.

Another object is to provide such a process which can be used at room temperature and below.

Another object is to provide such a process which reduces the release of volatile organic compounds (VOC's) in open systems.

Another object is to provide such a process which can be utilized in the presence of materials which absorb or reflect ultraviolet radiation.

Another object is to provide such a process which permits control of the average molecular weight of the product, including the weight range and the degree of branching and cross-linking.

Other objects will be apparent to those skilled in the art in light of the following description.

In accordance with one aspect of this invention, generally stated, a process for polymerizing ethylenically unsaturated monomer monomers is provided comprising providing in the monomer an initiator which responds to ultrasonic energy to form free radicals, and subjecting the monomer and initiator to sufficient ultrasonic energy to cause the initiator to form free radicals.

Preferably, the process is carried out at a bulk temperature below 40° C., most preferably at a temperature below 30° C. Also preferably, the process is carried out in the presence of an inert gas bubbling through the monomer or dissolved inert gases present.

The present invention is directed to processes in which the reaction conditions are chosen to favor initiation over chain transfer. It is not concerned with processes such as graft polymerization in which chain transfer or cross-linking predominate; in particular, it is not concerned with such processes in which a polymeric initiator/chain transfer agent is used. The initiators of the present invention are chosen to have a molecular weight less than 1,000, and the term "non-polymeric" is used herein to designate such initiators.

It has been found that some classic free radical initiators are not always effective as ultrasonic initiators while other compounds, such as surfactants, are. In the manner of classic free radical initiators, the ultrasonic initiators of the present invention produce higher molecular weight polymers at low concentration, and beyond a critical concentration produce decreasing average molecular weights, apparently acting as chain transfer agents at higher concentrations.

In the work to find special initiators for the ultrasonic polymerization of the present invention, not all the classic initiators were found to be suitable. Benzoyl peroxide was tried in a bulk MMA polymerization process without success. Then, 1-dodecanethiol (lauryl mercaptan) was tried to see if it would function as the initiator. In the classic case, 1-dodecanethiol is used as a chain transfer agent. For this new ultrasonic process, the energy of the ultrasonic source is very high, about $5 \times 10^8$ ergcm$^{-2}$. It appears that the collapse of the cavitation bubble interacts with the S—H bond to cause 1-dodecanethiol to decompose to form the radicals RS. and H.. Then the radical reacts with the MMA monomer to start the classical polymerization reactions.

Other initiators were then tried successfully in various polymerization processes. These include other surfactants such as sodium lauryl sulfate (sodium dodecyl sulfate), peroxides such as hydrogen peroxide, tert-butyl peroxide and ammonium persulfate, peracids such as peracetic acid, and cleavage-type initiators such as benzyl disulfide. Benzoyl peroxide was also found to be a successful ultrasonic initiator in a methyl methacrylate emulsion polymerization system. The successful use of this wide variety of free radical initiators indicates that further usable ultrasonic initiators may be determined by routine experimentation.

The concentration of the ultrasonic free radical initiator can be varied in accordance with well-known practice to vary the yield, average molecular weight, and other characteristics of the polymer produced by the reaction. For many purposes, it has been found desirable to maintain the concentration of initiator at around five percent (mol/mol) or less, most preferably below about one percent.

The yields obtained by means of the present invention are also far in excess of those obtained by prior systems. Yields greater than 20% in 30 minutes are characteristic.

It has also been found that cavitation most probably is responsible for the production of free radicals from the initiators and that contrary to what might have been expected the process of the present invention appears to be based on production of free radicals by pressure oscillations rather than by thermal effects. The inert gas used in the preferred embodiments appears to act as a nucleation site for bubbles which collapse with a local pressure on the order of $10^6$ atmospheres.

The present invention has found to be operative with a wide variety of ethylenically unsaturated monomers, but its usefulness is limited in the case of those polymers such as polystyrene which depolymerize substantially in the presence of ultrasonic energy sufficient to activate the initiator for the polymerization reaction.

Ultrasonic energy has been widely used or proposed for the purpose of suspending the reaction mixture and providing smaller, more uniform sizes of the polymer particles. An example of such a process is Tsubota et al, U.S. Pat. No. 4,849,318.

Polymerization due to ultrasound was reported by Lindström and Lamm, *J. Phys. and Colloid. Chem.*, 55, 1139 (1951) for a system of acrylonitrile in an aqueous medium. Kruus (Kruus and Patraboy, *J. Phys. Chem.*, 89, 3379 (1985); Kruus, McDonald, and Patraboy, *J. Phys. Chem.*, 91, 3041 (1987); and Kruus, Lawrie, and O'Neill, *Ultrasonics*, 26, 352 (1988)) and others (e.g., Briggs, Johnson, and Mason, *J. Acoust. Soc. Am.*, 19, 664 (1947); Schmid, *Ztschr. Elektrochem.* 45, 659 (1939); Suslick, *Scientific American*, 260, 80 (Feb. 1989), and Bremner, *Chemistry in Britain* 633 (1986)) have published both polymerization and depolymerization processes by ultrasonics. It has been shown by Briggs et al that as the viscosity increases the cavitation threshold also increases. The irreversible viscosity decreases occurring after ultrasonic irradiation of high polymers have been demonstrated by Schmid, using a frequency of 300 KHz and a power of 10 W/cm$^2$. Polystyrene samples with initial molecular weight values of 100,000, 150,000 and 300,000, degraded to corresponding molecular weight values of 30,000, 70,000 and 40,000, after two hours of ultrasonic treatment.

In none of these prior art systems, however, has a low molecular weight, non-polymeric initiator been specifically provided which is broken down by ultrasonic energy to produce free radicals without added heat as in the present invention.

BRIEF DESCRIPTION OF THE DRAWINGS

The drawing FIGURE is a diagrammatic representation of an apparatus for carrying out a preferred embodiment of the method of the present invention.

DESCRIPTION OF THE PREFERRED EMBODIMENTS

The following is a series of experiments conducted to develop an understanding of the use of ultrasonic energy to be the energy source to give a free radical polymerization reaction with chemical catalysts in accordance with the present invention.

EXAMPLE 1

ULTRASONICALLY INITIATED FREE RADICAL CATALYZED BULK POLYMERIZATION OF METHYL METHACRYLATE WITH 1-DODECANETHIOL AS THE INITIATOR CATALYST

A Sonics and Material ultrasonic generator (20 kHz) Model VC-1500 together with a standard titanium horn, was used in this and the following cavitation experiments. The power output was measured calorimetrically and could be varied between 0 W and 100 W. Most of the runs were made with the oscillator power set on 60 Wcm$^{-2}$ (on a scale of 100) with cooling air through the ultrasonic horn. Ultrasonic irradiation of the initiator was carried out with the tip of the coupling horn immersed directly in the solution as shown in FIG. 1.

Reagent grade 1-dodecanethiol ($C_{12}H_{25}S$—H) and 1,4-dioxane were used without further purification. Reagent grade methyl methacrylate was purified to remove the hydroquinone inhibitor by extraction with base and by passing through a Scientific Polymer Ltd DHR-4 column which removes the inhibitor chromatographically.

Several experiments were performed to determine the effects of a change in concentration of the initiator, the effect of a change in power and other variables that can give information about the rate of production of polymer.

The methyl methacrylate and 1-dodecanethiol were put into a glass cell. Argon was vigorously bubbled through the solution for 3 minutes to remove the air in the solution. An appropriate ice bath was placed around the glass cell. During the polymerization, dried argon was bubbled continuously through the solution in order to promote cavitation by providing nuclei for the formation of the cavitation bubbles. Samples were withdrawn from the glass cell at intervals as indicated hereinafter. A vacuum oven, at 50° C. overnight, was used to remove the impurities such as solvent, monomer, initiator, and other volatile by-products from the product sample. It was then weighed to calculate the conversion.

Molecular weight determination was performed on the polymer samples. Samples were chosen to determine the effects of time of irradiation, acoustic intensity and concentration of initiator on the molecular weight of the polymer. Solutions of 0.1 wt % polymer in tetrahydrofuran were analyzed by Gel Permeation Chromatography (GPC) using a micro-Styragel column. Calibration was with polystyrene standards.

Effect of Changing the Amount of the Initiator and of the Reaction Time

The polymerization was carried out for three hours with an acoustic intensity of 60 Wcm$^{-2}$ at room temperature using different concentrations of the 1-dodecanethiol initiator in five separate runs. The concentrations were 0.001%, 0.01%, 0.1%, 0.5%, and 1.0%. In each case samples were taken at 30 minute intervals, and the amount of polymer did not change after the first 30 minutes of reaction time. It appears that the polymerization reaction was complete in a very short time period (5 to 10 min).

The molecular weight of the polymer sample products decreased when the amount of the initiator was increased. The number average molecular weight of the poly(methyl methacrylate) after three hours reaction time declined from about 330,000 at 0.001% (mol/mol) initiator to about 300,000 g/mol at 0.5% initiator. At 1.0% initiator, however, the average molecular weight dropped to about 200,000. From these results, one sees that at low concentrations, 1-dodecanethiol can act as an initiator, and at higher concentrations, it acts as a chain transfer agent.

The conversion of the polymer increased as the amount of the initiator increased. After three hours, the percent conversion with 0.001% initiator was about 8%; at 0.01% initiator about 11%; at 0.1% initiator about 22%; at 0.5% initiator about 33%; and at 1.0% initiator about 55%.

Effect of Increasing the Amount of the Initiator Incrementally 100 ml of methyl methacrylate and 0.2% (mol/mol) of 1-dodecanethiol were put into the glass cell. After 10 minutes, 2 ml of the sample solution was removed for analysis and then an additional 0.2% (mol/mol) of 1-dodecanethiol was added. This was repeated eight times.

Initiator concentration plays a significant role in controlling the molecular weight and the conversion. As the amount of the initiator increases gradually, the conversion becomes linearly larger, from just over 10% at ten minutes to just under 80% at eighty minutes, and the molecular weight decreases nearly linearly from about 300,000 g/mol at ten minutes to about 20,000 g/mol at eighty minutes.

Samples of 100 ml of MMA monomer with mol ratios of 0.001, 0.01, 0.1, 0.5, 1.0, and 5% initiator (1-dodecanethiol) were also prepared for polymerization. The conversion and the molecular weights of these samples were measured. Again, conversion was proportional to initiator concentration, and molecular weight was inversely proportional to initiator concentration.

Effects of the Acoustic Intensity

A series of polymerizations was carried out with different acoustic intensities. For these reactions, 0.1% of the initiator was used. The polymerization of the poly(methyl methacrylate) solution was carried out with variable acoustic intensities for 3 hours. Acoustic intensity is one of the factors that helps to determine the amount of conversion to polymer. The conversion increased from 24% to 30% when the power was increased from 20 W to 100 W. The larger the acoustic intensity, the higher the yield of the polymer.

Molecular Weight Analysis

The number average molecular weights of the poly(methyl methacrylate) products obtained by gel permeation chromatography ranged from 148,000 to 333,000 g/mol, while the weight average molecular weights ranged from 283,000 to 339,000 g/mol. The degree of polymerization, $X_n$ of PMMA was 1,480 to 3,330.

Thermal Method

The experimental results showed that with 1% and 5% of the initiator present in the methyl methacrylate solution, polymerization did not occur at 100° C. by traditional heating method. This experimental result helps to prove that the polymerization was by ultrasonic cavitation, not by a thermal process.

The Effects of No Initiator and of Different Initiators

Experimental results show that for methyl methacrylate solutions, the ultrasonic polymerization reaction did not occur without the 1-dodecanethiol present. It proved that the double bond of the monomer would not become a radical and start the polymerization process under the conditions that give polymer when 1-dodecanethiol was present. In polymerization reactions, vinyl monomers need to have an initiator to start the polymerization reaction. 1-Dodecanethiol can act as the initiator for the methyl methacrylate to polymerize with ultrasound. In a thermal process, 1-dodecanethiol does not initiate the polymerization process. 1-Dodecanethiol, the special initiator, is only one of several initiators found suitable for the ultrasonic polymerization of methyl methacrylate. Benzyl disulfide also acted as a polymerization catalysts with the ultrasonic energy. Benzoyl peroxide and carbon tetrabromide did not act as catalysts at room temperature. Separate experiments showed that benzoyl peroxide decomposes to phenyl benzoate under the foregoing reaction conditions.

Effects of the Gas Purge and Cavitation

Methyl methacrylate samples with 0.1% (mol/mol) of the initiator were used with and without ultrasonic energy and with and without argon gas bubbling into the reactor. Reaction times were for 3 hours and 24 hours. The argon gas bubbling is important in the experimental arrangement described, apparently for purging as well as cavitation. Cessation of argon bubbling causes the polymerization to decrease or stop.

Polymerization Rates

Apparent polymerization rate increased with increased initiator concentration.

EXAMPLE 2

ULTRASONICALLY INITIATED FREE RADICAL CATALYZED SOLUTION AND EMULSION POLYMERIZATION OF POLYACRYLAMIDE WITH VARIOUS INITIATOR CATALYSTS

The same equipment was used as in Example 1. Reagent grade acrylamide, peracetic acid, hydrogen peroxide, 1-dodecanethiol, and 1,4 dioxane were used without further purification.

Acrylamide monomer and initiator in a solvent were put into the glass cell. Argon was vigorously bubbled through the solution for 3 minutes to remove the air in the solution. An appropriate ice bath was placed around the glass cell. During the polymerization, the entire system was placed in a cooling bath controlled at −20° C. Dried argon was bubbled continuously through the solution in order to promote cavitation by providing nuclei for the formation of the cavitation bubbles. Samples were withdrawn from the glass cell at intervals as indicated hereinafter. The product samples were dried at 50° C. overnight under vacuum to remove impurities such as solvent, monomer, initiator, and other volatile by-products. The sample was reweighed and the conversion calculated.

Polymer samples were chosen to determine the effects of time of irradiation, acoustic intensity, identity of initiator, and concentration of initiator on the molecular weight of the polymer. Solutions of polyacrylamide in water were used to measure the intrinsic viscosity at dilute solution concentration in order to calculate the viscosity average molecular weight.

In separate experiments, the system included acrylamide and 1-dodecanethiol dissolved in dioxane, acrylamide and 1-dodecanethiol dissolved in water, acrylamide and peracetic acid dissolved in water, acrylamide and 1-dodecanethiol dissolved in ethylene glycol, and acrylamide and hydrogen peroxide dissolved in water.

In a first experiment, 40 g of acrylamide was dissolved in dioxane to give 100 ml of solution, and 0.001, 0.01, 0.1, 0.5, 1.0, and 5% (mol/mol) or 1-dodecanethiol were tested. Samples were taken every thirty minutes for three hours. Polyacrylamide is not soluble in dioxane and precipitates from the reaction mixture. Viscosity average molecular weight of the resulting polyacrylamide decreased from about 85,000 to about 10,000 as the initiator concentration increased. The degree of polymerization, $X_n$, of PAAm was 1200 to 169 depending on initiator concentration. Conversion increased from about 11% to about 33% with increasing initiator concentration. Increasing acoustic intensity from 20

W to 100 W increased conversion, but a 60 W setting was chosen for ease of maintaining the bulk temperature of the system.

With 0.5% of the 1-dodecanethiol initiator present in the acrylamide dioxane solution, polymerization did not occur at 70° C. by traditional heating. In the absence of the initiator, ultrasonic polymerization did not occur.

In a second experiment, a 16% aqueous solution of acrylamide was formed and 0.0062%, 0.062%, and 6.2% (mol/mol) of peracetic acid was added as initiator. Samples were taken at 4 minute intervals. After 4 minutes, viscosity average molecular weight varied inversely with percent initiator from about 550,000 to about 210,000. The degree of polymerization, $X_n$, of PAAm was 9200 to 2600 depending on initiator concentration. After 20 minutes, percent conversion varied inversely with initiator concentration, from about 24% to about 33%.

Apparent rate constants increased with increasing concentrations of peracetic acid. Apparent rate constants also increased as the amount of water was increased from a ratio of water to solvent of 3:1 to 6:1, the concentrations of monomer and initiator being held constant. The percent conversion also increased as monomer concentration decreased and increased linearly with time.

The effect of monomer concentration on molecular weight varied with time until twenty minutes, when all concentrations produced a viscosity average molecular weight of about 200,000. This result is consistent with a further experiment in which an aqueous solution of 3.33% commercial polyacrylamide having a viscosity molecular weight of about 1,500,000 was exposed to ultrasonic irradiation. The PAAm was degraded to a viscosity average molecular weight of about 200,000 after twenty minutes and remained at this value.

Heating an acrylamide water solution to 45° C. in the presence of peracetic acid did not result in polymerization. In the absence of initiator, ultrasonic excitation did not produce a polymerization reaction.

A third experiment was performed in which an aqueous solution of 20% acrylamide was polymerized using 0.006% of three different initiators in separate runs. Peracetic acid produced viscosity average molecular weights ranging from 350,000 at 5 minutes to 150,00 at twenty minutes; hydrogen peroxide produced molecular weights from 625,000 to 325,000; and 1-dodecanethiol produced molecular weights from 750,000 to 425,000. Similarly, using a 25% aqueous solution of acrylamide, the same concentration of initiator produced twenty-minute conversions of about 27% for peracetic acid, 25% for 1-dodecanethiol, and 22% for hydrogen peroxide. At an initiator concentration of 0.062% (mol/mol), 1-dodecanethiol produced a somewhat lower apparent rate constant than did the other two initiators.

EXAMPLE 3

ULTRASONICALLY INITIATED FREE RADICAL CATALYZED SOLUTION COPOLYMERIZATION OF STYRENE AND MALEIC ANHYDRIDE WITH 1-DODECANETHIOL AS THE INITIATOR CATALYST

The same equipment was used as in Example 1. Reagent grade styrene, maleic anhydride, 1-dodecanethiol and tetrahydrofuran (THF) were used without further purification.

In our hands, polymer could not be produced from pure styrene or from pure maleic anhydride with ultrasonics. However, attempts to prepare a copolymer of styrene and maleic anhydride were successful. Several experiments were used to determine the effects of a change in concentration of the initiator, the effect of a change in power and other variables that can give information about the rate of production of polymer.

The styrene, maleic anhydride and 1-dodecanethiol dissolved in tetrahydrofuran were put into the glass cell in a cold bath at −25° C. Argon was vigorously bubbled through the solution for 3 minutes to remove the air in solution. During the polymerization, dried argon was bubbled continuously through the solution in order to promote cavitation by providing nuclei for the formation of the cavitation bubbles. Samples were withdrawn from the glass cell at 5 minute intervals. The product samples were dried at 50° C. overnight under vacuum to remove the impurities such as solvent, monomer, initiator, and other volatile by-products. The sample was reweighed and the conversion calculated.

Polymer samples were chosen to determine the effects of time of irradiation, acoustic intensity and concentration of initiator on the molecular weight of the polymer. Solutions of 0.1 wt % of the copolymers in tetrahydrofuran were analyzed by Gel Permeation Chromatography (GPC) using a micro-Styragel column. Calibration was with polystyrene standards.

Effect of Changing the Amount of the Initiator and the Reaction Time

Samples with 16 g of styrene and 15 g of maleic anhydride dissolved in 30 ml of THF solution and 0.0014, 0.014, 0.14, and 1.4% (mol/mol) of 1-dodecanethiol were put into the glass cell. Sample solutions were removed for analysis at five minute intervals, and the conversion and the molecular weights of these samples were measured.

The number average molecular weight of the poly(styrene co maleic anhydride) varied from 13,000 to 150,000 g/mol. The highest molecular weights were formed at initiator concentration of 0.01%, with values of around 100,000 for 0.001% initiator concentration, around 60,000 to 80,000 for 0.1%, and 20,000 and below for 1%. Molecular weight values are comparable at 10, 20, and 30 minutes. Initiator concentration plays a significant role in controlling the molecular weight.

One sees an increase in conversion as a function of time with the highest concentration (1.4%) of initiator giving the least conversion (under 5% at 5 minutes and under 10% at 30 minutes), probably because of chain transfer. The remaining three concentrations of initiator give conversion percentages which are comparable with each other, ranging at thirty minutes from about 20% for the 0.014% concentration to about 25% for the 0.0014% concentration to about 35% for the 0.14% concentration.

Effects of the Acoustic Intensity

A series of polymerizations was carried out with different acoustic intensities. For these reactions, 0.14% of the initiator was used. The conversion increased as the power was increased from 20 W to 60 W.

Molecular Weight Analysis

The number average molecular weight of the poly(styrene co maleic anhydride) products obtained by GPC varied form 13,000 to 150,000 g/mol. .

Thermal Method

The experimental results showed that with 0.1% of the initiator present in the monomer solution, polymerization did not occur under 65° C. by the traditional heating method. Thus, for the ultrasonic polymerization with initiator, the solution was in a cooling bath at −25° C. and the solution temperature did not rise above 15° C. This experimental result helps to prove that the polymerization was by ultrasonic cavitation and not by a thermal process.

The Results of the Effects of Initiators

Experimental results show that for monomer solutions, the ultrasonic polymerization reaction did not occur without the 1-dodecanethiol present. It proved that the double bond of the monomer would not form a radical and start the polymerization process under the conditions that give polymer when 1-dodecanethiol was present. 1-dodecanethiol can act as the initiator for styrene and maleic anhydride to polymerization via ultrasound. This involves the energy of the ultrasonic wave breaking the RSH into the RS. and H. radicals. This would continue as the classical polymerization process. In a thermal process, 1-dodecanethiol does not initiate the polymerization process. 1-Dodecanethiol, the special initiator, is one of several initiators found suitable for the ultrasonic polymerization process.

The Effects of Reaction Time on Molecular Weight of Polymer

Reports in the literature suggest that polystyrene is depolymerized with ultrasonics. Our work at 0.0014% initiator shows an increase of molecular weight for the first 15 minutes, followed by a decrease in molecular weight as a function of further polymerization time. This suggests some depolymerization of this copolymer with ultrasonics. Because conditions can be chosen to favor the polymerization reaction over depolymerization, however, the process of the present invention is capable of providing acceptable copolymer.

EXAMPLE 4

ULTRASONICALLY INITIATED FREE RADICAL CATALYZED EMULSION POLYMERIZATION OF METHYL METHACRYLATE WITH VARIOUS INITIATOR CATALYSTS

The same equipment was used as in Example 1. Reagent grade methyl methacrylate (MMA), sodium lauryl sulfate, peracetic acid, ammonium persulfate, and benzoyl peroxide were used without further purification.

The same procedure as in the previous Examples was used, and the bath was maintained at −10° C. The general experimental conditions involved the addition of 100 ml of water to 22 ml of MMA monomer and 1 gram of surfactant (sodium lauryl sulfate). The polymerization was for thirty minutes with 60 watts power at 20 KHz. Varying amounts of each initiator were used in separate experiments.

The initiators were chosen to be soluble in water (ammonium persulfate), in MMA (benzoyl peroxide), and in both (peracetic acid).

When no catalyst and no surfactant were present, no polymerization occurred, over a range of 5 to 95 volume percent MMA. Further experiments were carried out with 22 ml MMA per 100 ml water. When only the surfactant was added, a trace yield was obtained. When 0.1 gram peracetic acid was added, a 35% yield was obtained. When 0.1 gram ammonium persulfate was added, a 55% yield was obtained. When 0.1 gram benzoyl peroxide was added, the yield was 30%. The molecular weight of the polymer from these reactions varied from 350,000 to 1,100,000 depending on the concentration of initiator.

EXAMPLE 5

ULTRASONIC POLYMERIZATION OF ACRYLAMIDE WITHOUT ARGON GAS BUBBLING

The same equipment was used as in Example 1, but without Argon bubbling during the reaction. Reagent grade acrylamide, propylene glycol, and dodecanethiol were used without further purification.

The same procedure as in the previous Examples was used, and the bath was maintained at −10° C. The general experimental conditions involved the addition of 20 grams of monomer and a varying amount of the initiator dodecanethiol to 80 grams of propylene glycol solvent. The system was placed in the cooling bath (−15° C.) and the temperature of the reaction mixture was maintained at from −10° to below 35° C. No argon was used during the polymerization. Ultrasonic energy was applied for 4 minutes. The product was immediately precipitated with methanol to give yields of 20% with 0.01% initiator, 52% with 0.1% initiator, 60% with 0.5% initiator, and 65% with 1% initiator. If the system was left to digest and coagulate for 24 hours before isolation of the polymer, the corresponding yields were 69% with 0.01% initiator, 71% with 0.1% initiator, 78% with 0.5% initiator, and 87% with 1% initiator. The molecular weights ranged from 26,000 at 0.5% initiator to 45,000 at 0.01% initiator. Molecular weight with 1.0% initiator was not measured.

Similar results are obtained when ethylene glycol solvent is substituted for propylene glycol.

The foregoing examples are merely exemplary of the scope of the invention. Numerous variations, within the scope of the appended claims will occur to those skilled in the art in light of the foregoing disclosure. Merely by way of example, other low molecular weight, non-polymeric initiators which break down to form free radicals under intense ultrasonic excitation may be utilized. Other homopolymerization and copolymerization monomers may be chosen, such as the common ternary mixture of MMA, butyl methacrylate and acrylic acid. These variations are merely illustrative.

We claim:

1. A process for polymerizing at least one ethylenically unsaturated monomer comprising providing a mixture of the monomer and a non-polymeric initiator which responds to ultrasonic energy to form free radicals, and subjecting the mixture of monomer and initiator to sufficient ultrasonic energy to cause the initiator to form free radicals, the process being carried out at a bulk temperature below 40° C. to produce at least 20% conversion of monomer to polymer.

2. The process of claim 1 wherein the initiator comprises less than about 5% (mol/mol) of the monomer.

3. The process of claim 1 wherein the process is carried out at a bulk temperature below 30° C.

4. The process of claim 1 wherein the process is carried out in the presence of an inert gas bubbling through the mixture.

5. The process of claim 4 wherein the gas is selected from the group consisting of argon, nitrogen, and carbon dioxide.

6. The process of claim 1 wherein the initiator is chosen from the group consisting of surfactants, peroxides, peracids, and benzyl disulfide.

7. The process of claim 6 wherein the initiator is chosen from the group consisting of 1-dodecanethiol, sodium lauryl sulfate, hydrogen peroxide, peracetic acid, and benzyl disulfide.

8. The process of claim 1 wherein the initiator is a chain transfer agent in thermally initiated polymerizations.

9. The process of claim 1 wherein more of the initiator is added during polymerization.

10. The process of claim 9 wherein the initiator is added incrementally during polymerization.

11. The process of claim 1 wherein the ethylenically unsaturated monomer is selected from the group consisting of acrylics, alkenes, vinyl halides, acrylonitriles, and mixtures thereof.

12. The process of claim 1 wherein the ethylenically unsaturated monomer is a mixture of different ethylenically unsaturated monomers.

13. The process of claim 1 wherein the monomers are mixed without added solvent.

14. The process of claim 1 wherein the monomers are carried in a liquid medium.

15. The process of claim 14 wherein the monomer is soluble in the liquid medium and the polymer is not soluble in the liquid medium and precipitates from the liquid medium during polymerization.

16. The process of claim 14 wherein the liquid medium is water, the monomer is emulsified in the water by a surfactant, and the initiator is soluble in water.

17. The process of claim 14 wherein the liquid medium is water the monomer is emulsified in the water by a surfactant, and the initiator is soluble in the monomer.

18. The process of claim 1 wherein the initiator comprises less than 1% (mol/mol) of the monomer.

19. The process of claim 1 wherein the process is carried out in the absence of an inert gas bubbling through the mixture.

20. The process of claim 1 wherein the process produces at least 40% conversion of monomer to polymer.

21. In the method of polymerizing at least one ethylenically unsaturated monomer by free radical initiation, the improvement comprising a step of adding a non-polymeric initiator which is broken down by ultrasonic energy to produce free radicals without added heat, a step of subjecting said initiator to ultrasonic energy sufficient to break the initiator down to produce free radicals without raising the bulk temperature of the monomers above about 40° C., and a step of continuing polymerization until at least 20% of the monomer has been polymerized.

22. A process for polymerizing at least one ethylenically unsaturated monomer at a bulk temperature below about 40° C. comprising providing a mixture of the monomer and a non-polymeric initiator which responds to ultrasonic energy to form free radicals, subjecting the mixture of monomer and initiator to sufficient ultrasonic energy to cause the initiator to form free radicals, and incrementally adding further of the initiator as polymerization proceeds.

23. In a process for polymerizing at least one ethylenically unsaturated monomer by applying ultrasonic energy to the monomer, the improvement comprising adding to the unsaturated monomer a non-polymeric initiator which responds to ultrasonic energy by forming free radicals and causing polymerization of at least 20% of the monomer in no more than 30 minutes at a bulk temperature of less than about 40° C.

24. The process of claim 1 wherein the ethylenically unsaturated monomer is selected from the group consisting of methyl methacrylate and acrylamide.

25. The process of claim 1 wherein the ethylenically unsaturated monomer is the combination of styrene and maleic anhydride or the combination of methyl methacrylate, butyl methacrylate, and acrylic acid.

* * * * *